United States Patent
Krupka et al.

(10) Patent No.: US 8,126,085 B2
(45) Date of Patent: Feb. 28, 2012

(54) METHOD AND APPARATUS TO ESTIMATE CHANNEL TAP

(75) Inventors: Eyal Krupka, Raanana (IL); Rotem Avivi, Petach-Tikva (IL)

(73) Assignee: Intel Corporation, Santa Clara, CA (US)

( * ) Notice: Subject to any disclaimer, the term of this patent is extended or adjusted under 35 U.S.C. 154(b) by 1397 days.

(21) Appl. No.: 10/992,791

(22) Filed: Nov. 22, 2004

(65) Prior Publication Data

US 2006/0109934 A1    May 25, 2006

(51) Int. Cl.
  *H04L 25/06*    (2006.01)
  *H04L 25/10*    (2006.01)

(52) U.S. Cl. ............... 375/317; 375/321; 375/148

(58) Field of Classification Search ............. 375/340, 375/344, 345, 317, 257; 455/63, 82, 226.1
See application file for complete search history.

(56) References Cited

U.S. PATENT DOCUMENTS

| | | | | |
|---|---|---|---|---|
| 4,890,160 A * | 12/1989 | Thomas | ...................... | 348/429.1 |
| 5,648,991 A * | 7/1997 | Namekata et al. | ............ | 375/341 |
| 6,141,393 A * | 10/2000 | Thomas et al. | ............... | 375/347 |
| 6,697,350 B2 * | 2/2004 | Lomp | ........................... | 370/342 |
| 6,707,805 B2 * | 3/2004 | Ozluturk et al. | .............. | 370/335 |
| 6,765,969 B1 * | 7/2004 | Vook et al. | ..................... | 375/259 |
| 6,977,977 B1 * | 12/2005 | Dubrovin et al. | ............. | 375/346 |
| 6,996,375 B2 * | 2/2006 | Dent et al. | .................. | 455/67.16 |
| 7,224,714 B1 * | 5/2007 | Barman et al. | ................. | 375/140 |
| 2003/0054384 A1 * | 3/2003 | Bass et al. | ......................... | 435/6 |
| 2004/0252668 A1 * | 12/2004 | Ozukturk et al. | ............. | 370/335 |
| 2005/0232174 A1 * | 10/2005 | Onggosanusi et al. | ....... | 370/286 |
| 2006/0133547 A1 * | 6/2006 | He | ................ | 375/346 |
| 2006/0193403 A1 * | 8/2006 | Ali | ................ | 375/340 |

OTHER PUBLICATIONS

Yano, Y.; Tachika, H.; Fujino, T; "Performance of DS/GMSK/PSK modem using four-phase correlator" IEEE, International Symposium on, vol. 1, Sep. 1996, pp. 249-253.*

* cited by examiner

*Primary Examiner* — Khanh C Tran
*Assistant Examiner* — Qutbuddin Ghulamali
(74) *Attorney, Agent, or Firm* — Kacvinsky Daisak PLLC

(57) ABSTRACT

Briefly, a method an apparatus and a wireless communication device are provided. The wireless communication device includes a receiver to receive complex sequences of symbols. The receiver includes an estimator to estimate one or more channel taps. The estimator includes a memory to store at least a portion of one or more calculated values of an estimation matrix and is capable to estimate the one or more channel taps based on a stored portion of calculated values of the estimation matrix.

11 Claims, 2 Drawing Sheets

METHOD AND APPARATUS TO ESTIMATE CHANNEL TAP

BACKGROUND OF THE INVENTION

Wireless communication systems such as, for example, cellular communication systems may include a plurality of modulation schemes. The modulation schemes may be determined by a cellular standard which may be in use by the wireless communication system. An example of a cellular standard may be Global System for Mobile Communications (GSM), General Packet Radio Service (GPRS), Enhanced Data for GSM Evolution (EDGE) and the like.

In EDGE/GSM modems and/or receivers, least squares (LS) channel estimation method may be used to estimate channel taps. The estimated channel taps may be used to estimate received symbols. For example, in the LS channel estimation method, a pseudo-inverse matrix based on prior known data such as, for example, training sequence symbols may be used. Furthermore, EDGE/GSM modems and/or receivers may include a digital signal processor (DSP). The DSP may load elements of a pseudo-inverse matrix stored in a memory and may multiply received sequences of symbols by the elements of the pseudo inverse matrix of the received sequences.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
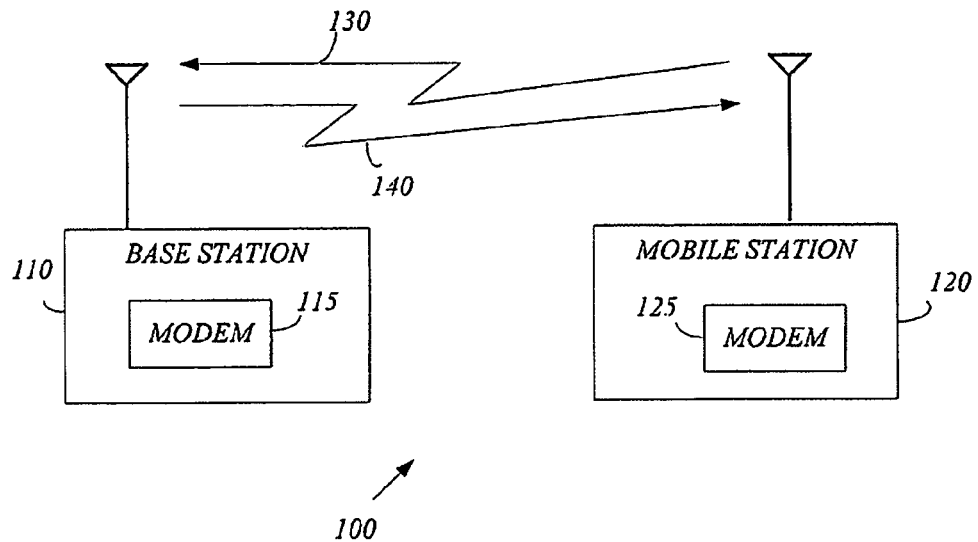
FIG. 1, is an illustration of a portion of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as receivers of a radio system. Receivers intended to be included within the scope of the present invention include, by way of example only, wireless local area network (WLAN) receivers, two-way radio receivers, digital system receivers, analog system receivers, cellular radiotelephone receivers and the like.

Types of cellular radiotelephone systems intended to be within the scope of the present invention include, although are not limited to, Code Division Multiple Access (CDMA) and wideband CDMA (WCDMA) cellular radiotelephone portable devices for transmitting and receiving spread spectrum signals, Global System for Mobile communication (GSM) cellular radiotelephone, Time Division Multiple Access (TDMA), Extended-TDMA (E-TDMA), GPRS, Extended GPRS, and the like.

Some embodiments of the invention may be implemented, for example, using a machine-readable medium or article which may store an instruction or a set of instructions that, if executed by a machine (for example, by stations of wireless communication system, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning to FIG. 1, a wireless communication system such as, for example, a cellular communication system 100 in accordance with exemplary embodiment of the invention, is shown. Although the scope of the present invention is not limited in this respect, cellular system 100 may include a base station 110, a mobile station 120, an uplink 130 and a downlink 140. Uplink 130 and downlink 140 may include one or more channels. In accordance with embodiments of the invention, a channel may be depicted as a physical transfer medium that may be used to transfer signals. Furthermore, a channel may be a combination of the physical transfer medium, components of the transmitter and/or receiver and may include channel taps (for example, symbols). According to embodiments of the invention, the channel may be estimated and/or measured by a channel time span. In embodiments of the invention, the channel time span may not exceed a certain number of symbols, for example seven symbols. In addition, the channel time span may not exceed a predetermined delay spread, if desired.

Although the scope of the present invention is not limited in this respect, mobile station 120 may include a modem 125, for example a GPRS, EDGE or the like. According to at least one embodiment of the invention, modem 125 may be used to estimate the channel taps according to a pre-stored portion of calculation of an estimation matrix.

Figure 2:
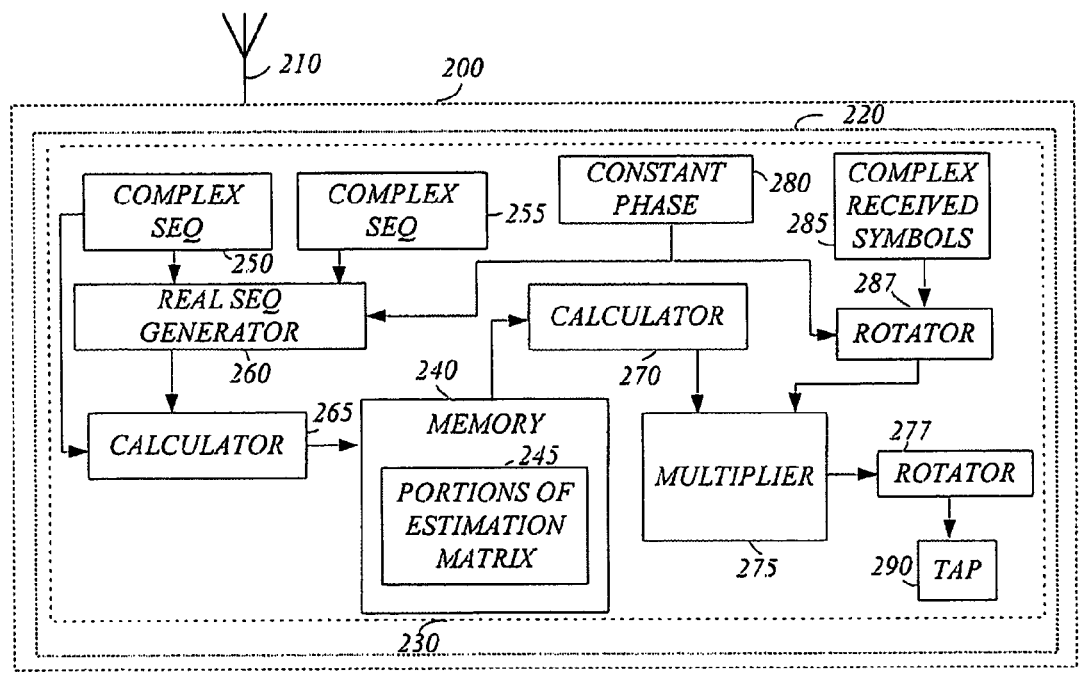
FIG. 2, is an illustration of a block diagram of a mobile station according to some exemplary embodiments of the present invention.

Turning to FIG. 2, a block diagram of a mobile station 200, according to an exemplary embodiment of the invention is shown. Although the scope of the present invention is not limited in this respect, mobile station 200 may include an antenna 210 and a receiver 220 which may include, for example, a modem such as, for example, GPRS modem, EDGE modem or the like. In embodiments of the invention, receiver and/or modem 220 may include an estimator 230. Estimator 230 may include the following software and/or hardware components and/or signals, if desired. In this exemplary embodiment, estimator 230 may include a memory 240, multiplier 275, sequences of complex symbols 250, 255, a real sequence generator 260, calculators 265, 270, a constant phase 280, a parameter L 263, a complex received symbols 285, rotators 277, 287, and a channel tap 290. According to this exemplary embodiment, memory 240 may store at least a portion of a calculation of estimation matrix 245. According to embodiments of the invention, parameter L 263 may include the number of channel taps to be estimated, if desired.

Although the scope of the present invention is not limited in this respect, estimator 230 may be capable of performing a least squares (LS) algorithm to estimate channel tap 290. For example, LS algorithm may calculate a set of complex pseudo-inverse matrix depending on a transmitted training sequence and a number of parameters to be estimated. For example, the parameters may include a training sequence code number, a channel length, a modulation type or the like. According to one or more embodiments of the invention, the pseudo-inverse matrix may be depicted by the following equation:

$$\text{PseudoInvMat} = (S^H S)^{-1} S^H \qquad \text{(Equation 1)}$$

where $S^H$ may be a convolution matrix such as, for example, a transpose Toeplitz matrix, which may be built from known training symbols. For example, a size of $S^H$ may be $L \times (M-L+1)$ of complex elements, wherein M may be the training sequence length and L may be the number of parameters to be estimated, e.g., parameter L 263.

For example, convolution matrix $S^H$ may include $X_n$ sequences of transmitted training symbols, and convolution matrix $S^H$ may be depicted as follows:

$$S^H = \begin{pmatrix} x_i & x_{i-1} & \cdots & x_{i-(L-1)} \\ x_{i+1} & & \cdots & x_{i+2-L} \\ \vdots & \vdots & \ddots & \vdots \\ x_{i+N-1} & x_{i+N-2} & \cdots & x_{i+N-L} \end{pmatrix} \qquad \text{(Equation 2)}$$

Where i=L−1 and N=M−L+1

Although the scope of the present invention is not limited in this respect, estimator 230 may estimate channel tap 290 by multiplying PseudoInvMat (Equation 1) with the received signal r(n) to produce a vector of estimated channel taps, e.g. EstChTaps(m), as depicted by the following equation:

$$\text{EstChTaps}(m) = \sum_{n=0}^{M-L+1} \text{PseudoInvMat}(m, n)^* r(n), \qquad \text{(Equation 3)}$$

$$m = 0: L-1.$$

Where r(n) may be the received signal at time n; and EstChTaps(m) is the estimated channel taps at time m.

Although the scope of the present invention is not limited in this respect, according to one embodiment of the invention, memory 240 may store a portion of calculations of estimation matrix 245. For example, portion of estimation matrix 245 may be InvMat=$(S^H S)^{-1}$ and the estimation matrix may be PseudoInvMat=$(S^H S)^{-1} S^H$ in accordance with Equation 1. For example, in one embodiment of the invention, $S^H$ may be a transpose Toeplitz matrix, which may be constructed from a predetermined complex sequence of symbols 250. Real sequence generator 260 may convert $S^H$ to real sequences, if desired Calculator 265 may calculate a portion of the estimation matrix 245 (e.g. InvMat=$(S^H S)^{-1}$) from the predetermined complex sequence of symbols 250.

Although the scope of the present invention is not limited in this respect, receiver 220 may receive a burst of symbols. Calculator 270 may multiply InvMat=$(S^H S)^{-1}$ with a portion of estimation matrix 245 e.g. $S^H$ in order to produce the desired pseudo-inverse matrix, e.g., PseudoInvMat=InvMat·$S^H$.

In some embodiments of the invention, for example, matrix InvMat may be conjugated symmetric or real symmetric around a main diagonal of the matrix InvMat. Thus, only a portion of the matrix, for example, a half matrix, may be stored in memory 240. Furthermore, the dimension of the stored portion of the matrix may be (L+1)×L/2 elements.

Although the scope of the present invention is not limited in this respect, the received signal r at time n may be depicted by: (cancel justification)

$$r(n) = \sum_k h(k) X(n-k) + N(n), \qquad \text{(Equation 4)}$$

$$n = L \ldots M, k = 0 \ldots L-1$$

Wherein:
h(k) may be the channel taps at time k;
X(n−k) may the transmitted training sequence at time n-k; and
$N_n$ may be the noise at time n.

According to other embodiments of the invention, receiver 220 may be a GPRS and/or EDGE modem. In this embodiment, receiver 220 may receive Gaussian Minimum Shift Keying (GMSK) and/or 8 phase Shift Keying (8PSK) training symbols, e.g. complex sequences 250, 255. Real sequence generator 260 may rotate the symbols of the complex sequences 250, 255 by a linear phase θn, for example, constant phase 280, to generate a real matrix. For example, complex sequences 250 and 255 may include 8PSK and/or GMSK sequences. For 8PSK sequence the phase θ may be $$\theta = \theta 1 = \frac{3\pi}{8}$$

and for GMSK the phase θ may be $$\theta = \theta 2 = \frac{\pi}{2}.$$

In addition, complex sequences of symbols 250, 255 may include a constant predetermined phase difference. For example, in some embodiments of the invention, the predetermined phase difference between 8PSK training symbols and GMSK training symbols may be $$\frac{\Pi}{8},$$

if desired. Additionally or alternatively, it should be understood that in embodiments of the present invention, any number of complex sequences which include a linear phase difference may be used.

According to this embodiment of the invention, calculator 265 may generate a portion of a real estimation matrix based on the real matrix, if desired The portion of the real estimation matrix (e.g. estimation matrix 245) may be stored in memory 240.

Although the scope of the present invention is not limited to this respect, calculator 265 may convert the real matrix to a portion of estimation matrix (e.g. InvMat=$(S^HS)^{-1})$ by performing calculations according to the following equation:

$$X'(n)=e^{j\theta n}X(n) \qquad \text{(Equation 5)}$$

wherein:
  X'(n), n=0:25, may be a real de-rotated transmitted training sequence symbols which may be provided by real sequence generator 260; and
  X(n) may be the transmitted training sequence complex rotated symbols.

Furthermore, Calculator 265 may generate the matrix $S^H$ based on X'(n) (e.g. a real matrix) to provide an InvMat= $(S'^HS')^{-1}$ and calculator 270 may calculate PseudoInvMat=InvMat·$S^H$, if desired.

Although the scope of the present invention is not limited in this respect, more than one real and/or complex matrix, e.g., a portion of estimation matrix 245, for example, InvMat= $(S'^HS')^1$, may be stored in memory 240 and may depend on parameter L 263, sequences 250, 255, the modulation type, and the constant phase 280, if desired.

Although the scope of the present invention is not limited in this respect, the received signal r(n) may be depicted by:

$$r(n) = \sum_k h(k)X(n-k)e^{-j\theta(n-k)} + N(m).$$

Rotator 287 may rotate the receive signal and may output the signal according to the following equation:

$$r'(n)=r(n)*e^{j\theta n}, n=L:M \qquad \text{(Equation 6)}$$

The result output signal r'(n) may thus be:

$$r(n)e^{j\theta n} = \sum_k (h(k)e^{j\theta k})X(n-k) + N(n)e^{j\theta n} \qquad \text{(Equation 7)}$$

and multiplier 275 may estimate channel tap 290 based on the stored portion of the estimation matrix 245. For example, the estimation of channel taps 290 may be performed by calculating h(m) according to the following equation:

$$h(m) = \sum_{n=0}^{M-L+1} PseudoInvMat(m,n)^*r(n), \qquad \text{(Equation 8)}$$

$$m=0:\ L-1$$

The estimated channel taps may be produced by rotating h(m). According to this embodiment of the invention, rotator 277 may rotate h(m) to produce channel tap 290 as depicted by the following equation:

$$EstChTaps(m)=h(m)e^{-j\theta m}, m=0:1:L \qquad \text{(Equation 9)}.$$

Although the scope of the present invention is not limited in this respect, it should be understood that the blocks and/or components of receiver 220 are shown as example only and may be implemented by hardware and/or by software and/or by any combination of hardware and software such as, for example a digital signal processor, if desire.

Figure 3:
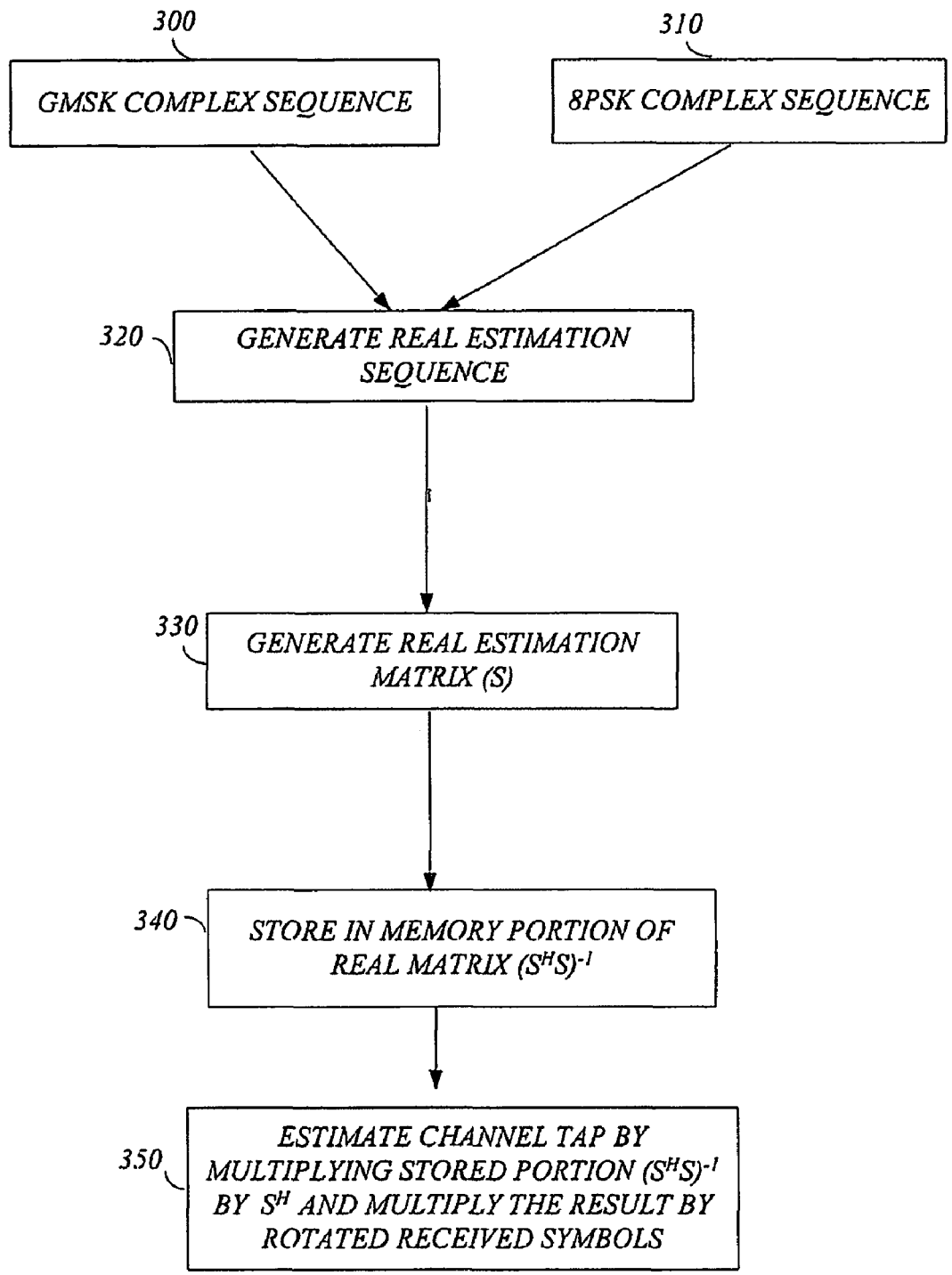
FIG. 3, is an illustration of a flowchart of a method of estimating a channel tap scheme according to exemplary embodiments of the present invention.

Turning to FIG. 3, a flowchart of a method to estimate a channel tap according to exemplary embodiments of the present invention is shown. Although the scope of the present invention is not limited to this respect, according to some exemplary embodiments of the invention, GMSK complex sequence (text block 300) and 8PSK complex sequence (text box 310) may be provided to a real sequence generator (e.g. real sequence generator 260). Real sequence generator may generate a real sequence by rotating the symbols of GMSK complex sequence (text block 300) and 8PSK complex sequence (text box 310) by a constant phase θ, respectively (text block 320).

Although the scope of the present invention is not limited in this respect, a real estimation matrix (S) may be generated from the real sequence (text block 330) and at least a portion of the real estimation matrix, for example $(S^HS)^{-1}$ may be stored in a memory (text block 340). According to embodiments of the invention, estimation of one or more channel taps may be done by multiplying the stored portion of the real estimation matrix $(S^HS)^{-1}$ by a matrix $S^H$ and multiplying the result by the rotated received symbols r'(n)=r(n)*$e^{j\theta n}$, if desired (text block 350).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
    generating a real sequence of symbols from a first and second predetermined complex sequences of symbols having a constant predetermined phase difference;

generating a real estimation matrix based on the real sequence of symbols and based on a number of parameters to be estimated, wherein the parameters comprise at least one of a training sequence code number, a channel length or a modulation type;

storing at least a portion of the real estimation matrix;

calculating the real estimation matrix based on at least the stored portion of the calculated values of the real estimation matrix; and estimating a channel tap by multiplying the stored portion of the real estimation matrix by a training symbol matrix and multiplying the result by rotated received symbols to generate a vector of estimated channel taps.

2. The method of claim 1, comprising: calculating the portion of the real estimation matrix from a predetermined real sequence of symbols.

3. The method of claim 1, comprising: providing a constant predetermined phase difference between the first and second predetermined complex sequences of symbols.

4. The method of claim 1, comprising: generating a real sequence of symbols based on the predetermined complex sequence of symbols; generating the real estimation matrix based on the real sequence of symbols; storing a portion of the real estimation matrix; and estimating the channel tap based on the stored portion of the real estimation matrix.

5. An apparatus comprising:
a receiver to receive a sequence of symbols;
a real sequence generator to generate a real sequence of symbols based on a first and second predetermined complex sequences of symbols having a constant predetermined phase difference;
a calculator to generate a real estimation matrix based on the real sequence of symbols and based on a number of parameters to be estimated, wherein the parameters comprise at least one of a training sequence code number, a channel length or a modulation type;
a memory to store at least a portion of one or more calculated values of the real estimation matrix;
a calculator to calculate the real estimation matrix based on at least the stored portion of the calculated values of the real estimation matrix; and
an estimator to estimate a channel tap by multiplying the stored portion of the real estimation matrix by a training symbol matrix and multiplying the result by rotated received symbols to generate a vector of estimated channel taps.

6. The apparatus of claim 5, comprising: a constant predetermined phase difference between the first and second predetermined complex sequences of symbols.

7. A wireless communication device comprising:
a receiver having:
a real sequences generator to generate a real sequence of symbols based on a first and second predetermined complex sequences of symbols having a constant predetermined phase difference; and
a first calculator to generate at least a portion of a real estimation matrix based on the real sequence of symbols and based on a number of parameters to be estimated, wherein the parameters comprise at least one of a training sequence code number, a channel length or a modulation type;
a memory to store at least a portion of one or more calculated values of the real estimation matrix,
a second calculator to calculate the real estimation matrix based on at least the stored portion of the real estimation matrix; and
an estimator to estimate a channel tap by multiplying the stored portion of the estimation matrix by a training symbol matrix and multiplying the result by rotated received symbols to generate a vector of estimated channel taps.

8. The wireless communication device of claim 7, wherein the receiver further comprises matrix; and a rotator to rotate received symbols by a constant phase.

9. The wireless communication device of claim 7, wherein the receiver comprises: a constant predetermined phase difference between the first and second predetermined complex sequences of symbols.

10. The wireless communication device of claim 7, wherein the receiver is able to the estimate the channel tap based on the complex sequences of symbols of an Enhanced Data for Global system for mobile communications Evolution (EDGE) standard.

11. The wireless communication device of claim 7, wherein the receiver is able to estimate the channel tap base on complex sequences of symbols of a general packet radio service standard.

* * * * *

UNITED STATES PATENT AND TRADEMARK OFFICE
CERTIFICATE OF CORRECTION

| | | |
|---|---|---|
| PATENT NO. | : 8,126,085 B2 | |
| APPLICATION NO. | : 10/992791 | |
| DATED | : February 28, 2012 | |
| INVENTOR(S) | : Krupka et al. | |

It is certified that error appears in the above-identified patent and that said Letters Patent is hereby corrected as shown below:

On the Title page, in Item (57), in column 2, in "Abstract", line 1, delete "method" and insert -- method, --, therefor.

In column 8, line 36, in claim 10, after "to" delete "the".

In column 8, line 41, in claim 11, delete "base" and insert -- based --, therefor.

Signed and Sealed this
Twenty-ninth Day of May, 2012

David J. Kappos
*Director of the United States Patent and Trademark Office*